United States Patent
Imanishi et al.

(10) Patent No.: US 12,154,726 B2
(45) Date of Patent: Nov. 26, 2024

(54) SOLID ELECTROLYTIC CAPACITOR ELEMENT AND SOLID ELECTROLYTIC CAPACITOR

(71) Applicant: Panasonic Intellectual Property Management Co., Ltd., Osaka (JP)

(72) Inventors: Yuma Imanishi, Osaka (JP); Kei Hirota, Okayama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 97 days.

(21) Appl. No.: 18/006,362

(22) PCT Filed: Aug. 19, 2021

(86) PCT No.: PCT/JP2021/030306
§ 371 (c)(1),
(2) Date: Jan. 20, 2023

(87) PCT Pub. No.: WO2022/044939
PCT Pub. Date: Mar. 3, 2022

(65) Prior Publication Data
US 2023/0268134 A1 Aug. 24, 2023

(30) Foreign Application Priority Data
Aug. 28, 2020 (JP) .................. 2020-144853

(51) Int. Cl.
*H01G 9/025* (2006.01)
*H01G 9/048* (2006.01)
(Continued)

(52) U.S. Cl.
CPC ............. *H01G 9/025* (2013.01); *H01G 9/048* (2013.01); *H01G 9/15* (2013.01); *H01G 9/26* (2013.01)

(58) Field of Classification Search
None
See application file for complete search history.

(56) References Cited

U.S. PATENT DOCUMENTS

| | | | |
|---|---|---|---|
| 6,151,205 A | 11/2000 | Kobayashi et al. | |
| 6,320,742 B1 * | 11/2001 | Wada | H01G 11/56 29/25.03 |

(Continued)

FOREIGN PATENT DOCUMENTS

| | | |
|---|---|---|
| JP | 11-087177 | 3/1999 |
| JP | 2003-007571 | 1/2003 |

(Continued)

OTHER PUBLICATIONS

International Search Report of PCT application No. PCT/JP2021/030306 dated Oct. 26, 2021.

*Primary Examiner* — Eric W Thomas
(74) *Attorney, Agent, or Firm* — Rimon P.C.

(57) ABSTRACT

A solid electrolytic capacitor element includes an anode body including a porous part, a dielectric layer, and a cathode part. The cathode part includes a solid electrolyte layer covering the dielectric layer. The anode body includes a first anode body part on which the solid electrolyte layer is disposed and a second anode body part on which the solid electrolyte layer is not disposed. The solid electrolyte layer includes a first solid electrolyte layer disposed in the porous part and a second solid electrolyte layer disposed outside the porous part. When a length of the first anode body part in a longitudinal direction thereof is defined as a length L, a thickness of the second solid electrolyte layer in a first region is more than or equal to 1 μm. The first region is a region between boundary between the first anode body part and the second anode body part and a position located away from boundary in a length 0.05 L in the first anode body part.

16 Claims, 3 Drawing Sheets

(51) Int. Cl.
*H01G 9/15* (2006.01)
*H01G 9/26* (2006.01)

(56) References Cited

U.S. PATENT DOCUMENTS

| | | | |
|---|---|---|---|
| 2003/0007311 | A1 | 1/2003 | Kojima et al. |
| 2010/0039751 | A1* | 2/2010 | Oohata ................. H01G 9/042 |
| | | | 361/523 |
| 2014/0133068 | A1 | 5/2014 | Iwai et al. |
| 2015/0092319 | A1 | 4/2015 | Tatsuno et al. |

FOREIGN PATENT DOCUMENTS

| | | |
|---|---|---|
| JP | 2012-134389 | 7/2012 |
| JP | 2015-073097 | 4/2015 |
| JP | 2019-145582 | 8/2019 |
| WO | 2013/080486 | 6/2013 |

\* cited by examiner

SOLID ELECTROLYTIC CAPACITOR ELEMENT AND SOLID ELECTROLYTIC CAPACITOR

CROSS-REFERENCE TO RELATED APPLICATIONS

This application is a U.S. national stage application of the PCT International Application No. PCT/JP2021/030306 filed on Aug. 19, 2021, which claims the benefit of foreign priority of Japanese patent application No. 2020-144853 filed on Aug. 28, 2020, the contents all of which are incorporated herein by reference.

TECHNICAL FIELD

The present disclosure relates to a solid electrolytic capacitor element and a solid electrolytic capacitor.

BACKGROUND

A solid electrolytic capacitor includes a solid electrolytic capacitor element including a solid electrolyte layer, lead terminals electrically connected to the solid electrolytic capacitor element, and an exterior body encapsulating the solid electrolytic capacitor element. The solid electrolytic capacitor element includes, for example, an anode body including a porous part in a surface layer, a dielectric layer provided on at least part of the surface of the anode body, a solid electrolyte layer covering at least part of the dielectric layer, and a cathode lead-out layer covering at least part of the solid electrolyte layer.

International Patent Application Publication No. 2013/080486 discloses "a capacitor including: a base material that includes a valve metal and has a first surface and a second surface facing each other; a first roughened layer made of a porous body formed by vapor deposition of a valve metal on the first surface, the first roughened layer having voids in an outer surface and an inside thereof; a first conductive polymer inner layer formed in the voids of the first roughened layer; a first conductive polymer outer layer formed on the outer surface of the first roughened layer; a second roughened layer formed by vapor deposition of a valve metal on the second surface, the second roughened layer having voids in an outer surface and an inside thereof; a second conductive polymer inner layer formed in the voids of the second roughened layer; a second conductive polymer outer layer formed on the outer surface of the second roughened layer; and a dielectric film formed on the surfaces of the first roughened layer and the second roughened layer, wherein a surface area of the second roughened layer is smaller than a surface area of the first roughened layer, and the second conductive polymer outer layer is thicker than the first conductive polymer outer layer".

Unexamined Japanese Patent Publication No. H11-87177 discloses "a solid electrolytic capacitor including, as a solid electrolyte, a conductive polymer compound formed by chemical oxidation polymerization, wherein a thickness of a conductive polymer compound layer in a central part of a capacitor element is at least more than or equal to 0.02 $\mu m$".

SUMMARY

One aspect of the present disclosure relates to a solid electrolytic capacitor element. The solid electrolytic capacitor element includes: an anode body including a porous part on a surface of the anode body; a dielectric layer covering at least part of the anode body; a cathode part covering at least part of the dielectric layer. The cathode part includes a solid electrolyte layer covering the at least part of the dielectric layer. The anode body includes: a first anode body part and a second anode body part. The first anode body part is a part on which the solid electrolyte layer is disposed. The second anode body part is a part on which the solid electrolyte layer is not disposed. The solid electrolyte layer includes a first solid electrolyte layer and a second solid electrolyte layer. The first solid electrolyte layer is disposed in the porous part. The second solid electrolyte layer is disposed outside the porous part. When the first anode body part has a length L in a longitudinal direction of the first anode body part, a thickness of the second solid electrolyte layer in a first region is more than or equal to 1 $\mu m$. The first region is a region between (i) a boundary between the first anode body part and the second anode body part and (ii) a position located away from the boundary in a length of 0.05 L in the first anode body part.

Another aspect of the present disclosure relates to an electrolytic capacitor. The electrolytic capacitor is a solid electrolytic capacitor including the solid electrolytic capacitor element according to the present disclosure.

According to the present disclosure, a decrease in electrostatic capacity of a solid electrolytic capacitor can be suppressed.

DESCRIPTION OF EMBODIMENT

Figure 1:
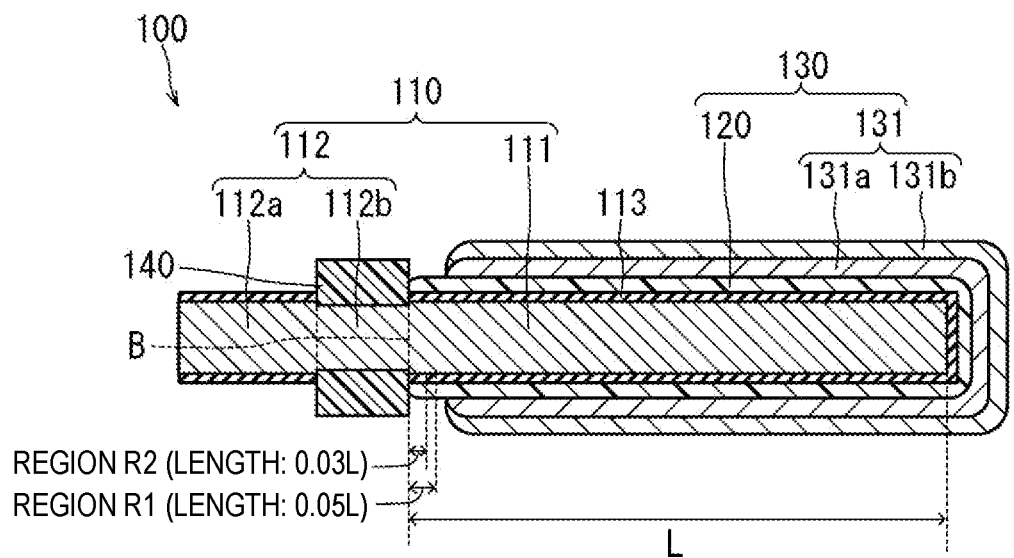
FIG. 1 is a cross-sectional view schematically illustrating part of a capacitor element in a first exemplary embodiment of the present disclosure.

Before describing the exemplary embodiment, an issue in the prior art will be briefly described below.

In the case of a solid electrolytic capacitor, oxygen in air outside the solid electrolytic capacitor may enter the inside of the capacitor element. When the oxygen having entered comes into contact with a solid electrolyte layer included in the capacitor element, the solid electrolyte is deteriorated, thereby resulting in a decrease in electrostatic capacity of the solid electrolytic capacitor. The decrease in electrostatic capacity due to the entry of oxygen is significant at high temperatures. In view of the above issue, the present disclosure provides a solid electrolytic capacitor element and a solid electrolytic capacitor capable of suppressing a decrease in electrostatic capacity of the solid electrolytic capacitor.

Hereinafter, an exemplary embodiment of the present disclosure will be described. In the following description, the exemplary embodiment of the present disclosure will be described by way of examples, but the present disclosure is not limited to the examples described below. In the following description, specific numerical values and materials are disclosed as examples in some cases, but other numerical values and materials may be applied as long as the effect of the present disclosure can be obtained. In this specification, when an expression "a range from a numerical value A to a numerical value B, inclusive" is used, the range includes the numerical value A and the numerical value B.

(Solid Electrolytic Capacitor Element)

A solid electrolytic capacitor element according to the present exemplary embodiment includes an anode body including a porous part on a surface thereof, a dielectric layer covering at least part of the anode body, and a cathode part covering at least part of the dielectric layer. The cathode part includes a solid electrolyte layer covering the at least part of the dielectric layer. The anode body includes a first anode body part on which the solid electrolyte layer is disposed, and a second anode body part on which the solid electrolyte layer is not disposed. The solid electrolyte layer includes a first solid electrolyte layer located in the porous part and a second solid electrolyte layer located outside the porous part. When the length of the first anode body part in its longitudinal direction is a length L, a thickness of the second solid electrolyte layer in a first region is more than or equal to 1 μm. The first region is a region between (i) a boundary between the first anode body part and the second anode body part and (ii) a position located away from the boundary in a length of 0.05 L in the first anode body part. Hereinafter, the boundary between the first anode body part and the second anode body part is referred to as a "boundary (B)" in some cases. The solid electrolytic capacitor element according to the present exemplary embodiment may be referred to as a "capacitor element (CE)". The region between boundary (B) and a position located away from boundary (B) in a length of 0.05 L in the first anode body part is referred to as a "region (R1)" in some cases.

As a result of study, the inventors of the present disclosure have newly found the following fact. Since the second solid electrolyte layer is thin in the vicinity of its end part, oxygen enters through the thin part in some cases, which leads to a decrease in electrostatic capacity. The present disclosure is based on this new finding.

In the capacitor element (CE), the thickness of the end part (region (R1)) of the second solid electrolyte layer is more than or equal to 1 Thus, entry of oxygen from the end part is reduced. As a result, in the capacitor element (CE) and the solid electrolytic capacitor including the capacitor element (CE), deterioration of characteristics (for example, electrostatic capacity) due to entry of oxygen is suppressed.

The thickness of the second solid electrolyte layer in the region (R1) may be more than or equal to 2 or may be more than or equal to 5 μm. An upper limit of the thickness of the second solid electrolyte layer in the region (R1) is not particularly limited, but may be less than or equal to 30 The lower limit and the upper limit can be arbitrarily combined as long as there is no contradiction.

The minimum thickness of the second solid electrolyte layer in the region between boundary (B) and a position located away from boundary (B) in a length 0.05 L in the first anode body part is defined as a thickness T1. A thickness of the second solid electrolyte layer at a position located away from boundary (B) in a length of 0.5 L in the first anode body part is defined as a thickness T2. At this time, the thickness T1 may be 0.5 times (for example, 0.7 times) larger than the thickness T2. The thickness T1 may be less than 3 times (for example, less than 1.5 times) the thickness T2. For example, the thicknesses T1 and T2 may satisfy 0.7 T2<T1<1.5T2. When the relationship 0.7T2<T1 is satisfied, entry of oxygen can be particularly reduced. When the relationship T1<1.5T2 is satisfied, good parallelism of the capacitor elements can be obtained at the time of welding of the anode body parts after stacking, and defects such as exposure can be reduced.

An average thickness of the first solid electrolyte layer may be more than or equal to 30 nm (for example, more than or equal to 50 nm). This configuration can sufficiently obtain initial electric characteristics of the solid electrolytic capacitor and thus is preferable. Here, the average thickness is obtained by measuring the thickness of the first solid electrolyte layer at arbitrary five points and averaging the five measured values. The thickness of the first solid electrolyte layer at any point can be measured using, for example, a scanning electron microscope (SEM) image of a cross-section of the first solid electrolyte layer.

An adhesive agent containing at least one element selected from the group consisting of C, N, O, and Si may be present on the surface of the first anode body part. In that case, it is preferable that an amount of the adhesive agent in the region between boundary (B) and a position located away from boundary (B) in a length of 0.03 L in the first anode body part be less than the amount of the adhesive agent in the region between a position located away from boundary (B) in a length of 0.03 L in the first anode body part and a position located away from boundary (B) in a length of L in the first anode body part. This configuration can prevent the end part of the second solid electrolyte layer from becoming thin.

In the region between boundary (B) and a position located away from boundary (B) in a length of 0.03 L in the first anode body part, an adhesive agent containing at least one element selected from the group consisting of C, N, O, and Si may be present. In that case, it is preferable that the adhesive agent may not be present in the region between a position located away from boundary (B) in a length of 0.03 L in the first anode body part and a position located away from boundary (B) in a length L in the first anode body part. This configuration can prevent the end part of the second solid electrolyte layer from becoming thin. The analysis of the adhesive agent can be determined, for example, from elemental analysis.

When the solid electrolytic capacitor element is manufactured, an adhesive agent may be used for part of the first anode body part. For example, a wiring for electrolytical polymerization of the solid electrolyte layer may be bonded with an adhesive agent, or an insulating tape may be bonded with an adhesive agent. The inventors of the present disclosure have newly found that the end part of the second solid electrolyte layer may become thinner due to spreading of the adhesive agent in the vicinity of the end part of the second solid electrolyte layer. By reducing the adhesive agent remaining in the vicinity of the end part of the second solid electrolyte layer, it is possible to prevent the end part of the second solid electrolyte layer from becoming thinner.

Examples of the adhesive agent containing at least one element selected from the group consisting of C, N, O, and Si include acrylic adhesive agent, silicone adhesive agent, and the like.

In the capacitor element (CE), it is preferable to prevent oxygen from entering the solid electrolyte layer from the second anode body part. For that purpose, a substance having high oxygen barrier properties is preferably present on the surface of part of the second anode body part adjacent to the first anode body part. Examples of such a substance include an insulating resin, a composition containing an insulating resin, an insulating tape, and a substantially void-free metal. For example, the oxygen barrier properties of part of the second anode body part adjacent to the first anode body part may be enhanced by removing a porous part present on the surface of the part or by compressing the porous part. Alternatively, an insulating resin (or a composition containing an insulating resin) may be applied to the porous part present on the surface of part of the second anode body part adjacent to the first anode body part, or an insulating tape may be disposed on the porous part.

The second anode body part may include an anode end part and a separation part disposed between the anode end part and the first anode body part. In that case, a first insulating resin may be disposed on at least part of the separation part. This configuration can reduce occurrence of a short circuit between the anode end part and the cathode part. Furthermore, this configuration can reduce entry of oxygen from the separation part. In a case where the separation part has a porous part on its surface, the first insulating resin may be disposed in the voids in the porous part.

Examples of the first insulating resin include an insulating tape (resist tape or the like) containing the first insulating resin, a coating film containing the first insulating resin, and the like. That is, a resin composition containing the first insulating resin may be disposed on at least part of the separation part.

The first insulating resin may be a thermoplastic resin or a curable resin. The number of types of insulating resin contained in the first insulating resin may be one, or more than one. Examples of the thermoplastic resin include polyolefin, polyester, polyamide, and thermoplastic polyimide. The curable resin may be thermosetting resin or photocurable resin. Examples of the photocurable resins include resin that can be cured with ultraviolet, visible light, or the like. Examples of the thermosetting resin include, but are not limited thereto, epoxy resin, phenol resin, unsaturated polyester resin, thermosetting polyurethane resin, thermosetting polyimide, and photoresist. The resin composition containing the first insulating resin may further contain a component other than the first insulating resin (for example, a curing agent, a curing accelerator, a catalyst, and an additive agent).

When the second anode body part includes the anode end part and the separation part, the second anode body part may have a recess disposed in the separation part. The first insulating resin described above may be disposed in the recess. For example, an insulating tape (resist tape or the like) containing the first insulating resin may be disposed in the recess.

The capacitor element (CE) may include a second insulating resin disposed on an outer surface of a part adjacent to boundary (B) in the second solid electrolyte layer. This configuration can reduce occurrence of a short circuit between the anode end part and the cathode part. Furthermore, this configuration can particularly reduce entry of oxygen through the second solid electrolyte layer.

The second insulating resin may be a thermoplastic resin or a curable resin. The number of types of insulating resin contained in the second insulating resin may be one, or more than one. The first insulating resin and the second insulating resin may be the same or different.

Examples of the thermoplastic resin used as the second insulating resin include at least one selected from the group consisting of vinyl resin (for example, vinyl chloride, vinyl acetate, and aromatic vinyl resin), polyolefin (for example, polyethylene and polypropylene), acrylic resin, polyamide, polycarbonate, thermoplastic polyimide, and polyamide-imide. Examples of the aromatic vinyl resin include polystyrene and acrylonitrile-butadiene-styrene copolymer (ABS resin). As the curable resin used as the second insulating resin, any of the resins described as examples of the second insulating resin may be used.

The second insulating resin may be disposed on the second solid electrolyte layer by, for example, applying a coating liquid or resin composition containing the second insulating resin to the second solid electrolyte layer and drying or curing the applied coating liquid or resin composition.

(Example of Components of Capacitor Element (CE))

Examples of components of the capacitor element (CE) will be described below. Known components may be used as components other than characteristic parts of the present disclosure.

(Anode Body)

As described above, the anode body includes a first anode body part on which the solid electrolyte layer is disposed, and a second anode body part on which the solid electrolyte layer is not disposed. The anode body may include a valve metal, an alloy containing the valve metal, a compound containing the valve metal, or the like. These materials may be used alone or in combination of two or more types thereof. As the valve metal, for example, aluminum, tantalum, niobium, or titanium is preferably used. The anode body having the porous part on its surface is obtained, for example, by roughening the surface of a metal foil containing a valve metal. The roughening may be performed by electrolytic etching or the like. The entire anode body may be porous. Meanwhile, from the viewpoint of strength, the anode body preferably includes: a porous part disposed on each of both principal surfaces; and a core part disposed between the porous parts. Porosity of the core part is lower than the porosity of the porous part. The porous part is a region having a large number of fine pores. The core part is, for example, a region that is not subjected to electrolytic etching.

(Dielectric Layer)

The dielectric layer is an insulating layer that functions as a dielectric material. The dielectric layer may be formed by anodizing the valve metal of the surface of the anode body (for example, a metal foil). The dielectric layer only has to be disposed so as to cover at least part of the anode body. The dielectric layer is normally disposed on the surface of the anode body. Since the dielectric layer is disposed on the surface of the porous part of the anode body, the dielectric layer is disposed along inner wall surfaces of holes and hollows (also referred to as pits) in the surface of the anode body.

The typical dielectric layer includes oxides of the valve metal. For example, when tantalum is used as the valve metal, the typical dielectric layer contains $Ta_2O_5$, and when aluminum is used as the valve metal, the typical dielectric layer contains $Al_2O_3$. Note that the dielectric layer is not limited thereto, and any dielectric layer may be used as long as the dielectric layer functions as a dielectric material.

(Cathode Part)

The cathode part includes a solid electrolyte layer covering at least part of the dielectric layer and may further include a cathode lead-out layer covering at least part of the solid electrolyte layer. Hereinafter, the solid electrolyte layer and the cathode lead-out layer will be described.

(Solid Electrolyte Layer)

As described above, the solid electrolyte layer includes: the first solid electrolyte layer disposed in the porous part of the anode body (more specifically, in the void parts of the porous part); and the second solid electrolyte layer disposed outside the porous part.

The solid electrolyte layer contains a conductive polymer. The solid electrolyte layer may further contain at least one selected from the group consisting of a dopant and another additive agent as necessary. Examples of the dopant include, but are not limited thereto, p-toluenesulfonic acid, naphthalenesulfonic acid, and polystyrenesulfonic acid (PSS).

As the conductive polymer, a π-conjugated conductive polymer can be used, for example. Examples of the conductive polymer include polymers having polypyrrole, polythiophene, polyaniline, polyfuran, polyacetylene, polyphenylene, polyphenylene vinylene, polyacene, and polythiophene vinylene as a basic skeleton. The above-mentioned polymer also includes a homopolymer, a copolymer of two or more types of monomers, and derivatives of these polymers (a substitute having a substituent group group). For example, polythiophene includes poly (3,4-ethylenedioxythiophene) and the like. However, these are merely examples, and the conductive polymer is not limited to these examples.

The solid electrolyte layer only has to be disposed to cover at least part of the dielectric layer. The solid electrolyte layer may be disposed directly on the dielectric layer or may be disposed with a conductive precoat layer interposed therebetween. The precoat layer is formed of a conductive material (conductive polymer, inorganic conductive material, and the like), for example. The conductive material constituting the precoat layer is not particularly limited, and a known material can be used, for example.

(Cathode Lead-Out Layer)

The cathode lead-out layer only has to include at least a first layer that is in contact with the solid electrolyte layer and covers at least part of the solid electrolyte layer. The cathode lead-out layer may include a first layer and a second layer covering the first layer. Examples of the first layer include: a layer containing conductive particles; and a metal foil. Examples of the conductive particles include at least one selected from conductive carbon and metal powder. For example, a layer containing conductive carbon (hereinafter, sometimes referred to as a "carbon layer") may be used as the first layer, and a layer containing metal powder or a metal foil may be used as the second layer, where these two layers may constitute the cathode lead-out layer. When a metal foil is used as the first layer, the metal foil may constitute the cathode lead-out layer. Examples of the conductive carbon include graphite such as artificial graphite and natural graphite.

When a layer containing metal powder is used as the second layer, the second layer may be formed with a composition containing metal powder applied in a layer form onto the surface of the first layer. Examples of such a second layer include a metal-paste layer formed using a composition containing metal powder such as silver particles and a resin (binder resin). As the resin, a thermoplastic resin can be used, but a thermosetting resin such as an imide resin or an epoxy resin is preferably used.

When a metal foil is used as the first layer, the type of metal is not particularly limited, but it is preferable to use a valve metal such as aluminum, tantalum, or niobium, or an alloy containing the valve metal. As necessary, the surface of the metal foil may be roughened. On the surface of the metal foil, there may be provided an anodization film, and there may be provided a film of a different metal (different type of metal) from the metal constituting the metal foil, or a non-metal film. Examples of the different type of metal include metal such as titanium. Examples of the non-metal include non-metal such as carbon (conductive carbon and the like).

A coating film of the above different type of metal or non-metal (for example, conductive carbon) may be used as the first layer, and the metal foil may be used as the second layer.

(Solid Electrolytic Capacitor)

The solid electrolytic capacitor according to the present exemplary embodiment includes at least one solid electrolytic capacitor element. The solid electrolytic capacitor element is the above-described capacitor element (CE). The solid electrolytic capacitor may include a solid electrolytic capacitor element other than the capacitor element (CE). In a preferred example, all the solid electrolytic capacitor elements included in the solid electrolytic capacitor are the capacitor elements (CE). The number of solid electrolytic capacitor elements included in the solid electrolytic capacitor may be in the range from 1 to 20, inclusive (for example, in the range from 2 to 20, inclusive).

When the electrolytic capacitor includes a plurality of capacitor elements (CE), the capacitor elements (CE) may be stacked. Usually, the second anode body parts (for example, anode end parts) of the stacked capacitor elements (CE) are electrically connected to each other. For example, the first second anode body parts may be joined by welding. The plurality of first second anode body parts may be swaged by an anode lead terminal and then be welded. An anode lead terminal may be joined to at least one second anode body part.

Normally, the cathode lead-out layers of the stacked capacitor elements are electrically connected to each other. A cathode lead terminal is joined to a cathode lead-out layer of at least one capacitor element. The cathode lead terminal may be joined to the cathode lead-out layer via a conductive adhesive agent or solder. Alternatively, the cathode lead terminal may be joined to the cathode lead-out layer by welding (resistance welding, laser welding, or the like). The conductive adhesive agent is, for example, a mixture of a curable resin and carbon particles or metal particles.

The solid electrolytic capacitor may further include an exterior body and/or a case that encapsulates the above at least one solid electrolytic capacitor element. The case may include: a container such as a bottomed case; and a sealing body that seals an opening of the container. Examples of the material constituting each of the container and the sealing body include metallic material and resin material.

The exterior body preferably contains a cured product of a curable resin composition, and may contain a thermoplastic resin or a composition containing a thermoplastic resin. The curable resin composition may contain a curable resin and a filler. The curable resin is preferably a thermosetting resin. Examples of the resin material forming the case include a thermoplastic resin or a composition containing the thermoplastic resin. Examples of the metallic material forming the case include metal such as aluminum, copper, or iron, or alloy thereof (also including stainless steel, brass, and the like).

An end part of the anode lead terminal, and an end part of the cathode lead terminal are individually exposed to the outside of the exterior body or the case. The end parts are used for solder connection to a substrate on which the solid electrolytic capacitor is mounted, and for other purposes.

(Manufacturing Method of Solid Electrolytic Capacitor Element and Solid Electrolytic Capacitor)

There is no limitation in the manufacturing method of the capacitor element (CE) and the solid electrolytic capacitor according to the present exemplary embodiment. Except that the thickness of the second solid electrolyte layer is controlled, a known manufacturing method may be applied to the capacitor element (CE) and the solid electrolytic capacitor according to the present exemplary embodiments, and a known manufacturing method may be partially modified and applied.

The manufacturing method of the capacitor element (CE) and the solid electrolytic capacitor according to the present exemplary embodiment will be described below. Meanwhile, the capacitor element (CE) and the solid electrolytic capacitor according to the present exemplary embodiment may be manufactured by a method other than the method described below. Since the matters having been described with respect to the capacitor element (CE) and the solid electrolytic capacitor can also be applied to the following manufacturing method, redundant descriptions may be omitted. The matters described for the following manufacturing method can be applied to the capacitor element (CE) and the solid electrolytic capacitor according to the present exemplary embodiment.

An example of the manufacturing method of the solid electrolytic capacitor includes a step of manufacturing a capacitor element, a step of electrically connecting lead terminals to the capacitor element, and a step of covering part of the capacitor element and the lead terminals with an exterior body. Examples of these steps will be described below.

(Step of Manufacturing Capacitor Element)

A capacitor element is manufactured by the following procedure. The step of producing a capacitor element includes a step of forming an anode body having a porous part, a step of forming a dielectric layer on a surface of the anode body, a step of forming a solid electrolyte layer, and a step of forming a cathode lead-out layer. The manufacturing method of a solid electrolytic capacitor may further include a step of forming a separation part before the step of forming a solid electrolyte layer.

(1) Step of Forming Anode Body Having Porous Part

As a raw material of the anode body, a metal foil containing a valve metal is used, for example. The porous part can be formed by roughening a surface of a metal foil containing a valve metal, for example. By the roughening of the surface, a porous part is formed in a surface layer of the anode body (metal foil). Inside the metal foil there may be a base material part that is not roughened. The roughening may be performed by etching (for example, electrolytic etching) the surface of the metal foil, for example.

(2) Step of Forming Dielectric Layer

In this step, the dielectric layer is formed on the anode body. The dielectric layer may be formed by anodizing the surface of the metal foil to be the anode body. The anodizing can be performed by a known method such as an anodizing treatment. The anodizing treatment may be performed by applying a voltage between the anode body (anode) immersed in an anodizing liquid and the cathode immersed in the anodizing liquid. As the anodizing liquid, a phosphoric acid aqueous solution or the like is preferably used, for example.

The step of forming the dielectric material may be performed in one step or in multiple steps. For example, after forming a dielectric layer and further performing another step, a step of forming a dielectric layer may be performed again.

In a case where a separation part is formed on the anode body, before or after the dielectric layer is formed, the anode body (metal foil) is divided into an anode end part, the separation part, and a first anode body part. For example, the separation part may be formed by making part of the anode body into a thin-thickness part. The thin-thickness part may be formed by compressing or removing the porous part in the region that is to be the separation part. The compression may be performed by press working or the like. The removal of the porous part may be performed by cutting machining, laser processing, or the like.

A separation member may be disposed on a surface of the separation part. By performing the step of disposing the separation member before the step of forming the solid electrolyte layer, it is possible to prevent a conductive polymer from being formed on the anode end part when the solid electrolyte layer is formed. In a case where the separation member is bonded by an adhesive agent, an adhesive force of the separation member may be increased by heating. When the heating temperature is high, the adhesive agent easily spreads on the second anode body part. On a part where the adhesive agent has spread, the second solid electrolyte layer may become thinner. To address this issue, it is preferable that the heating be not performed at the time of bonding the separation member or that the heating temperature be set to a low temperature (for example, 70° C. or lower).

(3) Step of Forming Solid Electrolyte Layer

The solid electrolyte layer is formed, for example, by using a treatment liquid containing a precursor of the conductive polymer so as to polymerize the precursor on the dielectric layer. The polymerization can be performed by at least one of chemical polymerization and electrolytic polymerization. In the case of electrolytic polymerization, a conductive precoat layer may be formed prior to the electrolytic polymerization. Examples of the precursor of the conductive polymer include at least one selected from the group consisting of a monomer, an oligomer, and a prepolymer.

The solid electrolyte layer may be formed by attaching a treatment liquid (for example, a dispersion liquid or solution) containing a conductive polymer to the dielectric layer, and then drying the treatment liquid. Examples of the dispersion medium (or solvent) include water, an organic solvent, and a mixture thereof. The treatment liquid may further contain other components (at least one selected from the group consisting of a dopant and an additive agent, and the like).

A part of the solid electrolyte layer is formed in the porous part (more specifically, a void part of the porous part), and the other part is formed outside the porous part. As a result, the first solid electrolyte layer disposed in the porous part and the second solid electrolyte layer disposed outside the porous part are formed.

In a case where the solid electrolyte layer is formed by electrolytic polymerization, the electrolytic polymerization may be performed by disposing a conductive tape to supply electric power, in the vicinity of the second anode body part. At that time, an adhesive agent to fix the conductive tape may spread on the second anode body part. The second solid electrolyte layer may become thinner at a part where the adhesive agent has spread. Hence, when the conductive tape is disposed in the vicinity of the second anode body part, it is preferable that a distance between the second anode body part and the conductive tape be set to a certain interval. This makes it possible to reduce variations in the thickness of the second solid electrolyte layer and to reduce partial thinning of the second solid electrolyte layer.

A consideration will be given on a case where the solid electrolyte layer is formed by electrolytic polymerization after a precoat layer is formed. In this case, if the precoat layer is not sufficiently formed in the vicinity of boundary B, the second solid electrolyte layer in the vicinity of boundary B may be thinner. To address this issue, it is important to sufficiently form the precoat layer also in the vicinity of boundary B. For example, when the precoat layer is formed, it is preferable that the precoat layer be formed also in a region that is between boundary B and a position located away from boundary B in a length of 0.05 L in the first anode body part.

(4) Step of Forming Cathode Lead-Out Layer

In this step, the cathode lead-out layer is formed on the surface of the solid electrolyte layer. The cathode lead-out layer can be formed, for example, by applying a carbon paste and a silver paste to the solid electrolyte layer in this order. In this way, the capacitor element (CE) is formed.

(5) Production of Solid Electrolytic Capacitor

Next, a solid electrolytic capacitor is manufactured by the following method using the capacitor element (CE). Hereinafter, an example of a manufacturing method of a solid electrolytic capacitor including a plurality of the capacitor elements (CE) will be described.

First, a laminate is made by stacking the plurality of capacitor elements (CE). The anode end parts of the plurality of capacitor elements are electrically connected to each other by being joined by welding and/or swaging or the like. Adjacent cathode lead-out layers may be connected by a metal paste or the like. As necessary, an anode lead terminal is connected to the anode terminal part, and a cathode lead terminal is connected to the cathode lead-out layer.

As described above, a laminate of a plurality of capacitor elements (CE) is obtained. Next, the obtained laminate and parts of the lead terminals are encapsulated with an exterior body. The encapsulation may be performed using a known molding technique (injection molding, insert molding, compression molding, and the like). For example, heating may be performed after a material (resin composition) of the exterior body is disposed so as to cover the stacked solid electrolytic capacitor elements and parts of the lead terminals by using a predetermined mold. The exterior body is thus formed.

An example of the exemplary embodiment according to the present disclosure will be specifically described below with reference to the drawings. The above-described components can be applied to components of examples to be described below. The examples to be described below can be modified on the basis of the above description. The matters to be described below may be applied to the above exemplary embodiment. In the exemplary embodiments to be described below, components that are not essential to the solid electrolytic capacitor element and the solid electrolytic capacitor of the present disclosure may be omitted. The solid electrolytic capacitor element and the solid electrolytic capacitor to be described below may be manufactured by the method described above. Note that the following drawings are schematic diagrams and may be different from the actual configuration.

First Exemplary Embodiment

FIG. 1 is a cross-sectional view schematically illustrating a solid electrolytic capacitor element according to a first exemplary embodiment. Capacitor element 100 illustrated in FIG. 1 includes anode body 110, dielectric layer 113 covering at least part of anode body 110, and cathode part 130 covering at least part of dielectric layer 113. Cathode part 130 includes: solid electrolyte layer 120 covering at least part of dielectric layer 113; and cathode lead-out layer 131 covering at least part of solid electrolyte layer 120. Cathode lead-out layer 131 includes: carbon layer 131*a* disposed on solid electrolyte layer 120; and metal-paste layer 131*b* disposed on carbon layer 131*a*. In the surface of anode body 110, a principal surface on which solid electrolyte layer 120 is formed is roughened to be a porous part (see FIG. 2).

Anode body 110 includes first anode body part 111 and second anode body part 112. Solid electrolyte layer 120 is disposed on first anode body part 111. A solid electrolyte layer is not disposed on second anode body part 112. Second anode body part 112 includes anode end part 112*a* and separation part 112*b*. Separation part 112*b* is disposed between anode end part 112*a* and first anode body part 111.

In FIG. 1, boundary B between the first anode body part and the second anode body part is indicated by a dotted line for easy understanding. The boundary between anode end part 112*a* and separation part 112*b* is also indicated by a dotted line. Separation part 112*b* is thinner than the other parts of anode body 110. Separation member 140 is disposed on separation part 112*b*. Separation member 140 has insulation properties. Separation member 140 may contain the above-described first insulating resin.

The length of first anode body part 111 in the longitudinal direction is defined as L. FIG. 1 illustrates boundary B between the first anode body part and the second anode body part. FIG. 1 further illustrates the region R1 between boundary B and a position located away from boundary B in a length 0.05 L in first anode body part 111. FIG. 1 further illustrates the region R2 between boundary B and a position located away from boundary B in a length 0.03 L in first anode body part 111. The lengths 0.03 L and 0.05 L are lengths along the longitudinal direction of first anode body part 111.

Figure 2:
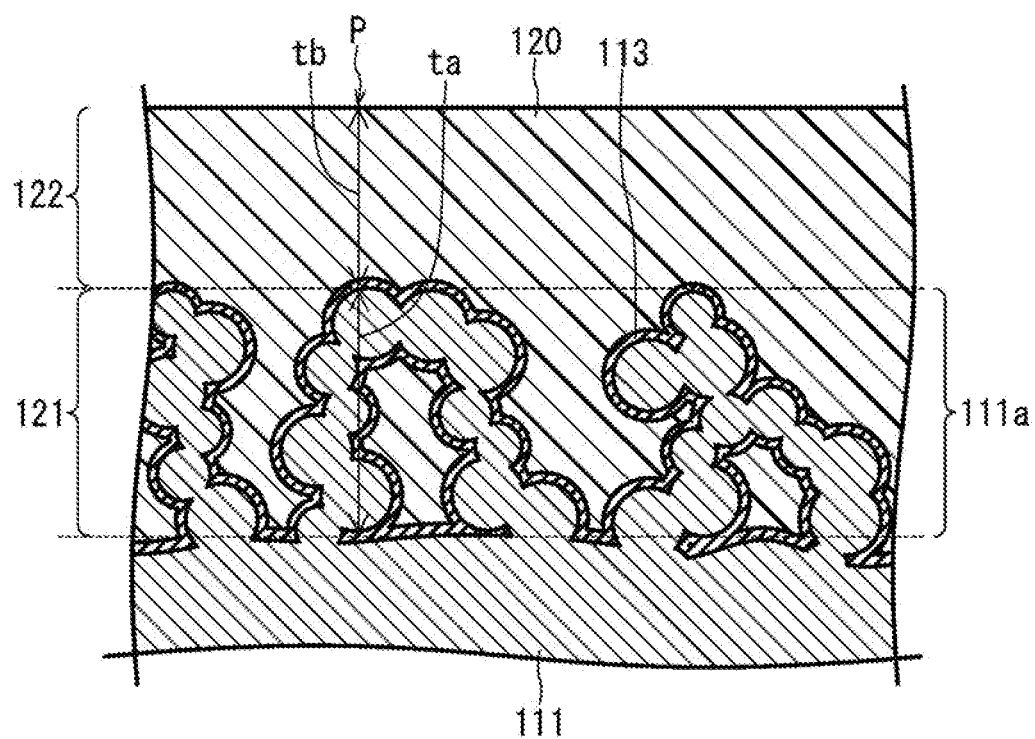
FIG. 2 is an enlarged view of a cross-section of part of the capacitor element illustrated in FIG. 1.

FIG. 2 schematically illustrates an enlarged view of a cross-section of solid electrolyte layer 120 formed on first anode body part 111. As shown in FIG. 2, first anode body part 111 has porous part 111*a* on the surface thereof. Solid electrolyte layer 120 includes first solid electrolyte layer 121 disposed in porous part 111*a*, and second solid electrolyte layer 122 disposed outside the porous part 111*a*. In other words, second solid electrolyte layer 122 is disposed outside first anode body part 111. First solid electrolyte layer 121 and second solid electrolyte layer 122 are connected to each other and constitute solid electrolyte layer 120.

FIG. 2 illustrates a thickness to of first solid electrolyte layer 121 and a thickness tb of second solid electrolyte layer 122 at certain point P. Although there are irregularities at the boundary between porous part 111*a* and the other part, the boundary between porous part 111*a* and the other part can be regarded as a plane when the thicknesses of the solid electrolyte layers are measured because the irregularities are small compared with the thickness of the solid electrolyte layer.

As described above, a thickness of second solid electrolyte layer 122 is more than or equal to 1 µm in the region R1 that is between boundary B between first anode body part 111 and second anode body part 112 and a position located away from boundary B toward in a length 0.05 L in first anode body part 111. This configuration can reduce entry of oxygen into part of first solid electrolyte layer 121 through a thin part of second solid electrolyte layer 122. Thus, it is possible to reduce deterioration of characteristics of the element due to oxygen.

The minimum thickness of second solid electrolyte layer 122 in a region between boundary B and a position located away from boundary B in a length 0.05 L in first anode body part 111 is defined as a thickness T1. The thickness of second solid electrolyte layer 122 at a position located away from boundary B in a length of 0.5 L in first anode body part 111 is defined as a thickness T2. The thickness T1 and the thickness T2 may satisfy the above-described relationship. Furthermore, an average thickness of the first solid electrolyte layer may be in the above-described range.

When an adhesive agent containing at least one element selected from the group consisting of C, N, O, and Si is present on the surface of first anode body part 111, the amount of the adhesive agent may be the above-described amount.

Figure 3:
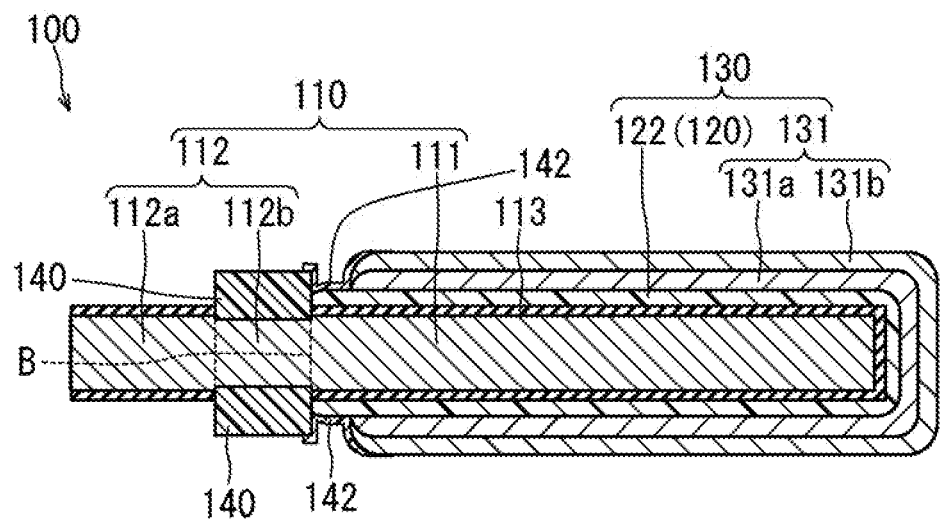
FIG. 3 is a cross-sectional view schematically illustrating another example of the capacitor element of the first exemplary embodiment.

On an outer surface of a portion adjacent to boundary B in second solid electrolyte layer 122, there may be disposed a layer containing the above-described second insulating resin. FIG. 3 schematically illustrates a cross-sectional view of capacitor element 100 including such layer 142. Layer 142 is formed so as to cover a part adjacent to boundary B in second solid electrolyte layer 122. Second solid electrolyte layer 122 in the vicinity of boundary B tends to be thin. The configuration illustrated in FIG. 3 can reduce the amount of oxygen passing through the part of second solid electrolyte layer 122 which tends to be thin.

Second Exemplary Embodiment

Figure 4:
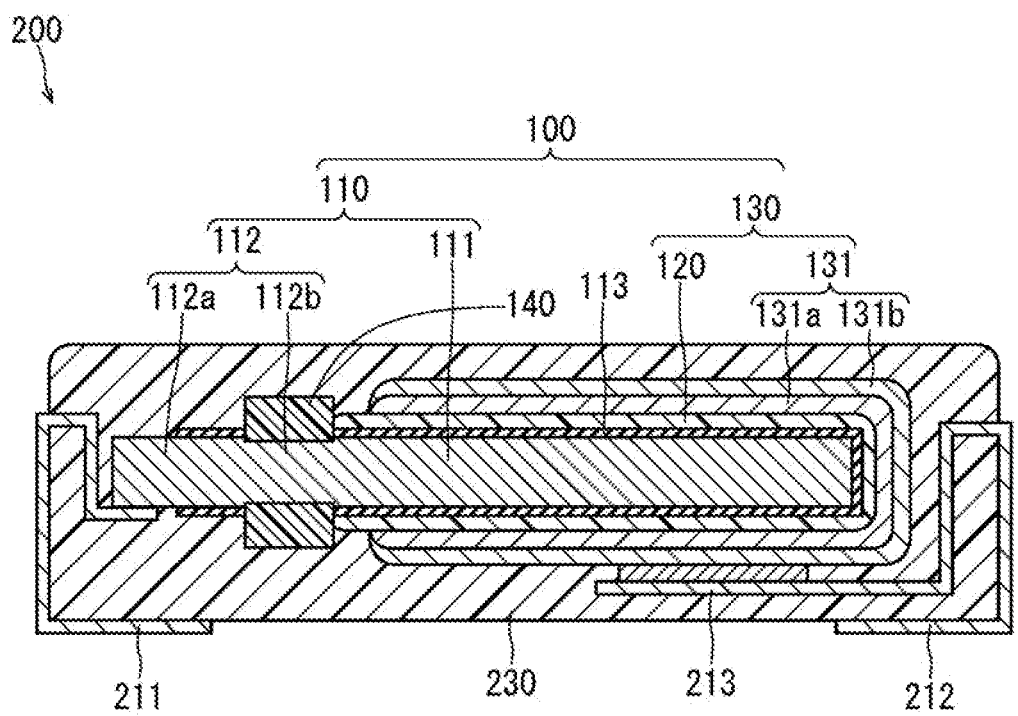
FIG. 4 is a cross-sectional view schematically illustrating an example of an electrolytic capacitor of a second exemplary embodiment.

FIG. 4 is a cross-sectional view schematically illustrating a solid electrolytic capacitor according to a second exemplary embodiment. Electrolytic capacitor 200 illustrated in FIG. 4 includes capacitor element 100, anode lead terminal 211, cathode lead terminal 212, and exterior body 230

Anode lead terminal 211 is connected to anode end part 112*a*. Cathode lead terminal 212 is connected to cathode lead-out layer 131 via conductive member 213 such as a metal paste. Part of anode lead terminal 211 and part of cathode lead terminal 212 are individually exposed from exterior body 230. The exposed parts function as terminals. Exterior body 230 is disposed so as to wholly cover capacitor element 100.

Capacitor element 100 is used for electrolytic capacitor 200. Thus, electrolytic capacitor 200 can reduce a decrease in electrostatic capacity due to oxygen.

Figure 5:
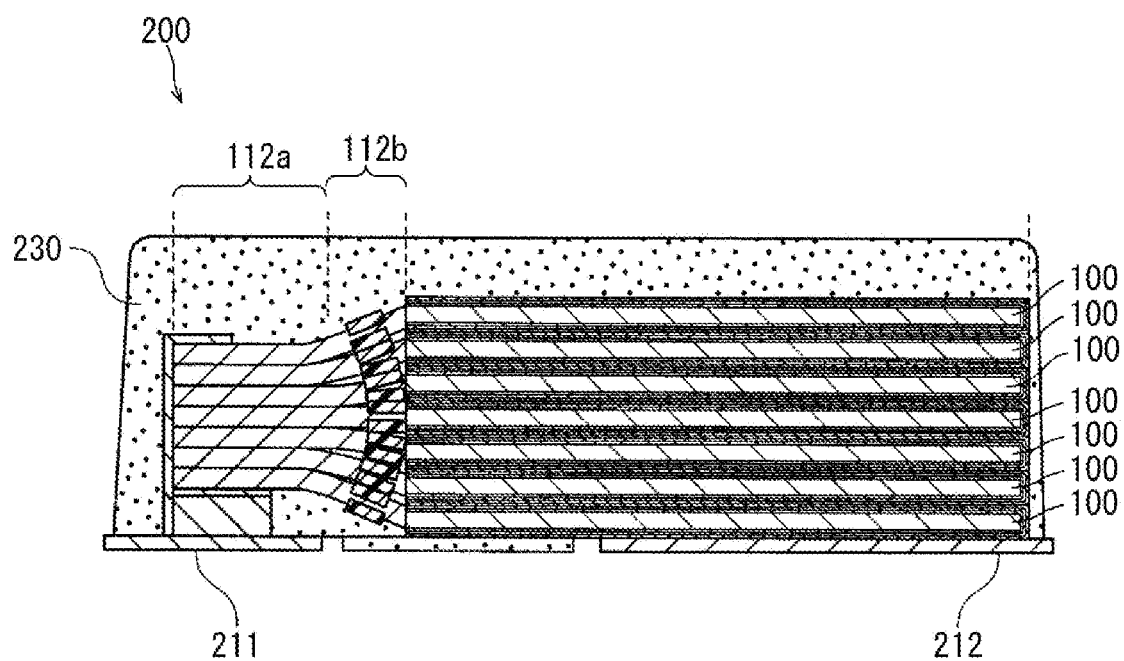
FIG. 5 is a cross-sectional view schematically illustrating another example of the electrolytic capacitor of the second exemplary embodiment.

The solid electrolytic capacitor according to the present disclosure may include a plurality of the capacitor elements. FIG. 5 schematically illustrates an example of a solid electrolytic capacitor including a plurality of capacitor elements 100. Electrolytic capacitor 200 in FIG. 5 includes a plurality of capacitor elements 100 stacked and connected in parallel. The plurality of capacitor elements 100 are covered with exterior body 230.

Example

A solid electrolytic capacitor element and a solid electrolytic capacitor according to the present disclosure will be described in more detail with reference to an example.
[Production and Evaluation of Electrolytic Capacitor A1]

A solid electrolytic capacitor (electrolytic capacitor A1) was produced by a method described below. Electrolytic capacitor A1 includes seven capacitor elements that are stacked and mutually connected in parallel. Each of the capacitor elements has a structure similar to the structure of capacitor element 100 described in the first exemplary embodiment.
(1) Production of Capacitor Element First, a surface of an aluminum foil (thickness: 100 μm) was subjected to an etching treatment to obtain an anode foil (anode body) including a porous part disposed on its surface. The anode foil was immersed in a phosphoric acid solution having a concentration of 0.3 mass % (liquid temperature: 70° C.), and a direct current voltage of 70 V was applied for 20 minutes. By the application of voltage, a dielectric layer containing aluminum oxide ($Al_2O_3$) was formed on the surface of the anode foil.

Next, a part, of the anode foil to be a separation part, was compressed by press working, thereby providing a recess. Next, an insulating resist tape (separation member) was attached to the recess. At this time, the separation member was firmly bonded to the recess by a heat treatment. The heat treatment was performed at 70° C. for 24 hours. In this way, the separation part on which the separation member was disposed was formed.

Next, the anode foil on which the separation part was formed was immersed in a liquid composition containing a conductive material, thereby forming a precoat layer on the anode foil. The precoat layer was formed in a region where the solid electrolyte layer was to be formed. Next, a polymerization liquid containing pyrrole (monomer of a conductive polymer), naphthalenesulfonic acid (dopant), and water was prepared. The anode foil on which the precoat layer was formed was immersed in the prepared polymerization liquid. In the state where the anode foil was immersed in the polymerization liquid, electrolytic polymerization was performed at an applied voltage of 3 V, thereby forming a solid electrolyte layer. By this step, the first solid electrolyte layer disposed in the porous part of the anode foil and the second solid electrolyte layer disposed outside the porous part were formed.

Next, a dispersion liquid in which graphite particles were dispersed in water was applied to the solid electrolyte layer, and then dried. By this step, a carbon layer was formed on the surface of the solid electrolyte layer. Next, a silver paste containing silver particles and a binder resin (epoxy resin) was applied to the surface of the carbon layer, and the binder resin was cured by heating. As a result, a metal-paste layer (silver-paste layer) was formed. In this way, a cathode lead-out layer was formed with the carbon layer and the silver-paste layer. As described above, the cathode part constituted by the solid electrolyte layer and the cathode lead-out layer was formed.
(2) Assembly of Electrolytic Capacitor A1

Seven capacitor elements were produced by the above method. A laminate was produced by stacking the seven capacitor elements. At this time, the anode terminal parts were connected to each other, and the silver-paste layers were connected to each other with a conductive adhesive agent. Furthermore, an anode lead terminal is connected to the anode terminal parts, and a cathode lead terminal is connected to the cathode lead-out layer. The obtained laminate was encapsulated with resin. As described above, an electrolytic capacitor A1 including the seven laminated capacitor elements connected in parallel and an exterior body covering the capacitor elements was obtained.
(3) Measurement of Thickness of Second Solid Electrolyte Layer With respect to the electrolytic capacitor A1, the thickness of the second solid electrolyte layer in a region (region R1 in FIG. 1) between boundary B and a position located away from boundary B in a length 0.05 L in the first anode body part was measured. Here, boundary B is the boundary between the first anode body part on which the solid electrolyte layer is formed and the second anode body part on which the solid electrolyte layer is not formed. The thickness of the second solid electrolyte layer was measured by the following method. First, a cross-section of an element as shown in FIG. 1 was polished to expose a cross-section in the vicinity of the central part of the element. The thickness of the second solid electrolyte layer was measured by observing the cross-section with an optical microscope (magnification of 1,000×). Specifically, the thickness T1 of the thinnest part of the second solid electrolyte layer in the region R1 in FIG. 1 was measured. In addition, a thickness T2 of the second solid electrolyte layer at a position located away from boundary B in a length of 0.5 L in the first anode body part was measured.

With respect to electrolytic capacitor A1, the presence or absence of an adhesive agent in the region R2 was evaluated by the method described above.

(4) Measurement of Change Ratio in Electrostatic Capacity Due to High-Temperature Keeping Test An initial electrostatic capacity F0 of the electrolytic capacitor A1 was measured in an environment of 20° C. using an LCR meter for 4-terminal measurement. Next, the electrolytic capacitor A1 was left to stand in an atmosphere at 165° C. for 200 hours (high-temperature keeping test). Thereafter, an electrostatic capacity F1 of the electrolytic capacitor A1 after the high-temperature keeping test was measured in the same manner as the initial electrostatic capacity F0. Then, the change ratio in electrostatic capacity was determined from the following formula.

Change ratio in electrostatic capacity(%)=(F1−F0)/F0×100

[Production and Evaluation of Electrolytic Capacitors A2 to A4 and C1]

Electrolytic capacitors A2 to A4 and C1 were produced under the same conditions and by the same method as those for the electrolytic capacitor A1 except that some production conditions were changed. Specifically, the conditions (temperature or time or both) of the heat treatment when the separation member was bonded to the recess were changed. There is the following tendency. As the temperature of the heat treatment is lower, the amount of the adhesive agent in the region R2 is smaller, and the thickness of the second solid electrolyte layer in the region R1 is thicker. Further, there is the following tendency. The time for the heat treatment is shorter, the amount of the adhesive agent in the region R2 is smaller, and the thickness of the second solid electrolyte layer in the region R1 is thicker. Specifically, the conditions of the heat treatment were varied as follows.

Electrolytic capacitor A2: 60° C. for 24 hours
Electrolytic capacitor A3: 50° C. for 24 hours
Electrolytic capacitor A4: 70° C. for 48 hours
Electrolytic capacitor C1: 100° C. for 24 hours The produced electrolytic capacitors were evaluated in the same manner as for the electrolytic capacitor A1. The results of the evaluation are shown in Table 1. When the change ratio in electrostatic capacity was less than or equal to −20%, it was determined as defective.

even after high-temperature keeping test. This is considered because the entry of oxygen from the region R1 was reduced. When the thickness of the second solid electrolyte layer in the region R1 was more than or equal to 5 μm (for example, more than or equal to 6 μm), the electrostatic capacity after high-temperature keeping test was particularly high. On the other hand, in the electrolytic capacitor C1 having a thin second solid electrolyte layer in the region R1, the electrostatic capacity after high-temperature keeping test decreased significantly.

The present disclosure can be used for solid electrolytic capacitor elements and solid electrolytic capacitors.

The invention claimed is:

1. A solid electrolytic capacitor element comprising:

an anode body including a porous part on a surface of the anode body;

a dielectric layer covering at least part of the anode body; and a cathode part covering at least part of the dielectric layer, the cathode part including a solid electrolyte layer covering the at least part of the dielectric layer, wherein:

the anode body includes a first anode body part and a second anode body part, the first anode body part being a part on which the solid electrolyte layer is disposed, the second anode body part being a part on which the solid electrolyte layer is not disposed, the solid electrolyte layer includes a first solid electrolyte layer and a second solid electrolyte layer, the first solid electrolyte layer being disposed in the porous part, the second solid electrolyte layer being disposed outside the porous part, when the first anode body part has a length L in a longitudinal direction of the first anode body part, a thickness of the second solid electrolyte layer in a first region is more than or equal to 1 μm, the first region being a region between (i) a boundary between the first anode body part and the second anode body part and (ii) a position located away from the boundary in a length of 0.05 L in the first anode body part, an adhesive agent containing at least one element selected from the group consisting of C, N, O, and Si is present on a surface of the first anode body part, and an amount of the adhesive agent in a second region between the boundary and a position located away from the boundary in a length of 0.03 L in the first anode body part is less than an amount of the adhesive agent

TABLE 1

| Electrolytic capacitor | T1 (μm) | T2 (μm) | T1/T2 | Presence or not of adhesive agent in region R2 | Change ratio in electrostatic capacity (%) | Determination |
| --- | --- | --- | --- | --- | --- | --- |
| A1 | 5.65 | 7.21 | 0.78 | Not present | −5.1 | Good |
| A2 | 8.29 | 9.33 | 0.89 | Not present | −8.5 | Good |
| A3 | 6.30 | 5.99 | 1.05 | Not present | −4.5 | Good |
| A4 | 2.21 | 3.58 | 0.62 | Not present | −16.3 | Good |
| C1 | 0.60 | 4.89 | 0.12 | Present | −57.0 | Defective |

As shown in Table 1, with respect to the electrolytic capacitors A1 to A4 in which the thickness of the second solid electrolyte layer in the region R1 were more than or equal to 1 μm, high electrostatic capacities were maintained in a third region between the position located away from the boundary in a length 0.03 L in the first anode body part and a position located away from the boundary in a length L in the first anode body part.

2. The solid electrolytic capacitor element according to claim 1, wherein 0.7T2<T1<1.5T2 is satisfied, where T1 represents a minimum thickness of the second solid electrolyte layer in the first region and T2 represents a thickness of the second solid electrolyte layer at a position located away from the boundary in a length of 0.5 L in the first anode body part.

3. The solid electrolytic capacitor element according to claim 1, wherein an average thickness of the first solid electrolyte layer is more than or equal to 30 nm.

4. The solid electrolytic capacitor element according to claim 1, wherein:

the second anode body part includes an anode end part and a separation part, the separation part being disposed between the anode end part and the first anode body part, and a first insulating resin is disposed on at least part of the separation part.

5. The solid electrolytic capacitor element according to claim 4, wherein the second anode body part has a recess disposed in the separation part.

6. The solid electrolytic capacitor element according to claim 1, further comprising a second insulating resin disposed on an outer surface of a part of the second solid electrolyte layer, the part of the second solid electrolyte layer being adjacent to the boundary.

7. A solid electrolytic capacitor comprising the solid electrolytic capacitor element according to claim 1.

8. The solid electrolytic capacitor according to claim 7, comprising a plurality of solid electrolytic capacitor elements that are stacked to each other, each of the plurality of solid electrolytic capacitor elements being the solid electrolytic capacitor element.

9. A solid electrolytic capacitor element comprising:

an anode body including a porous part on a surface of the anode body;

a dielectric layer covering at least part of the anode body; and a cathode part covering at least part of the dielectric layer, the cathode part including a solid electrolyte layer covering the at least part of the dielectric layer, wherein:

the anode body includes a first anode body part and a second anode body part, the first anode body part being a part on which the solid electrolyte layer is disposed, the second anode body part being a part on which the solid electrolyte layer is not disposed, the solid electrolyte layer includes a first solid electrolyte layer and a second solid electrolyte layer, the first solid electrolyte layer being disposed in the porous part, the second solid electrolyte layer being disposed outside the porous part, when the first anode body part has a length L in a longitudinal direction of the first anode body part, a thickness of the second solid electrolyte layer in a first region is more than or equal to 1 μm, the first region being a region between (i) a boundary between the first anode body part and the second anode body part and (ii) a position located away from the boundary in a length of 0.05 L in the first anode body part, an adhesive agent containing at least one element selected from the group consisting of C, N, O, and Si is present in a second region between the boundary and a position located away from the boundary in a length 0.03 L in the first anode body part, and the adhesive agent is not present in a third region between a position located away from the boundary in a length 0.03 L in the first anode body part and a position located away from the boundary in a length L in the first anode body part.

10. The solid electrolytic capacitor element according to claim 9, wherein 0.7T2<T1<1.5T2 is satisfied, where T1 represents a minimum thickness of the second solid electrolyte layer in the first region and T2 represents a thickness of the second solid electrolyte layer at a position located away from the boundary in a length of 0.5 L in the first anode body part.

11. The solid electrolytic capacitor element according to claim 9, wherein an average thickness of the first solid electrolyte layer is more than or equal to 30 nm.

12. The solid electrolytic capacitor element according to claim 9, wherein:

the second anode body part includes an anode end part and a separation part, the separation part being disposed between the anode end part and the first anode body part, and a first insulating resin is disposed on at least part of the separation part.

13. The solid electrolytic capacitor element according to claim 12, wherein the second anode body part has a recess disposed in the separation part.

14. The solid electrolytic capacitor element according to claim 9, further comprising a second insulating resin disposed on an outer surface of a part of the second solid electrolyte layer, the part of the second solid electrolyte layer being adjacent to the boundary.

15. A solid electrolytic capacitor comprising the solid electrolytic capacitor element according to claim 11.

16. The solid electrolytic capacitor according to claim 15, comprising a plurality of solid electrolytic capacitor elements that are stacked to each other, each of the plurality of solid electrolytic capacitor elements being the solid electrolytic capacitor element.

* * * * *